April 18, 1933.     F. W. EDWARDS     1,904,295
LUBRICATION ASSEMBLY
Filed June 6, 1930     2 Sheets-Sheet 1
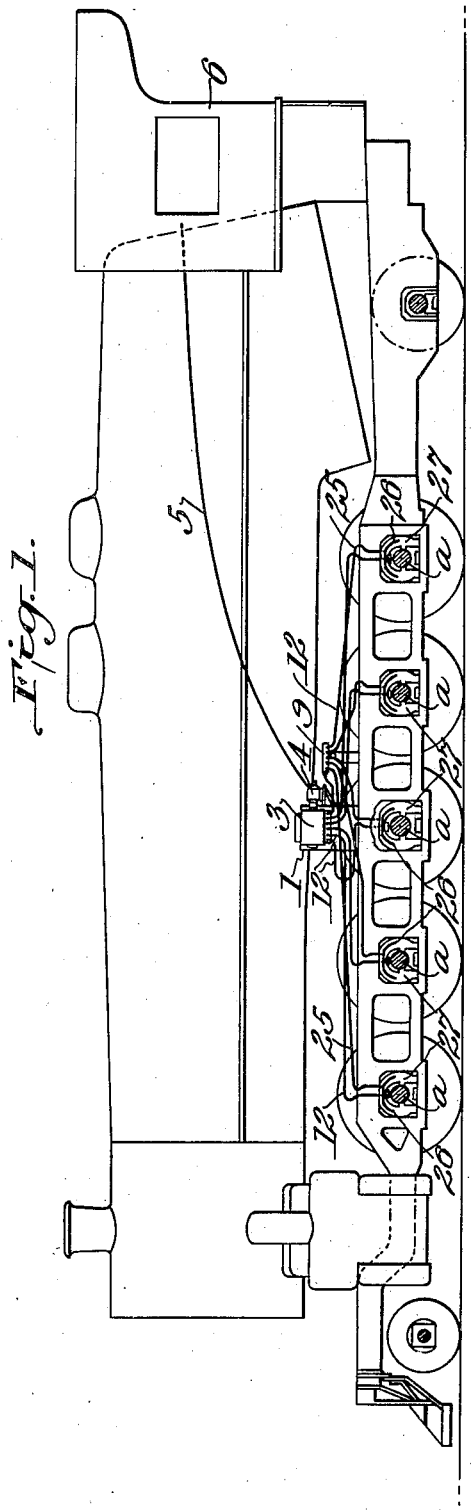
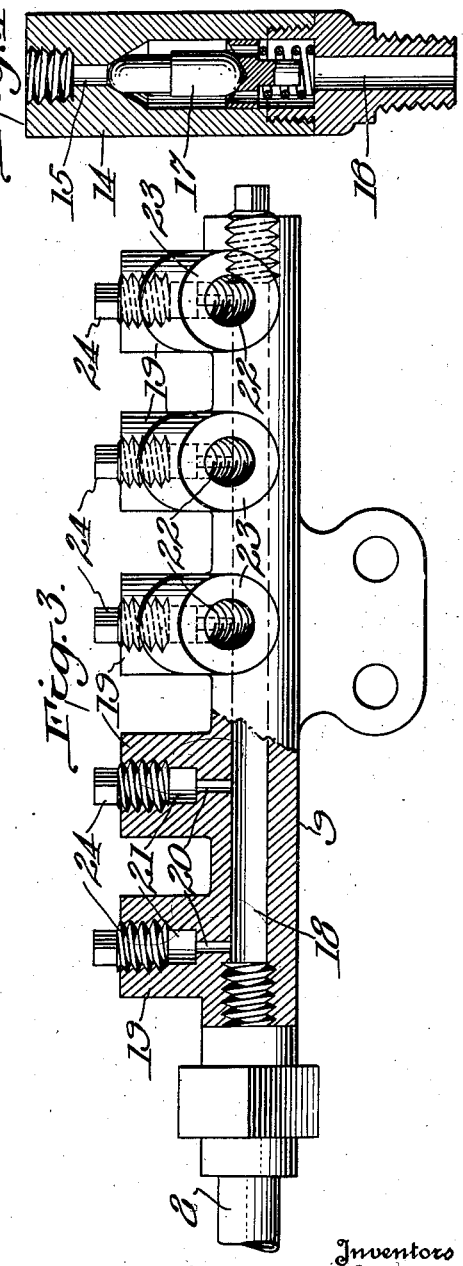
Inventor
Frank W. Edwards
by
Attorney April 18, 1933.  F. W. EDWARDS  1,904,295
LUBRICATION ASSEMBLY
Filed June 6, 1930   2 Sheets-Sheet 2
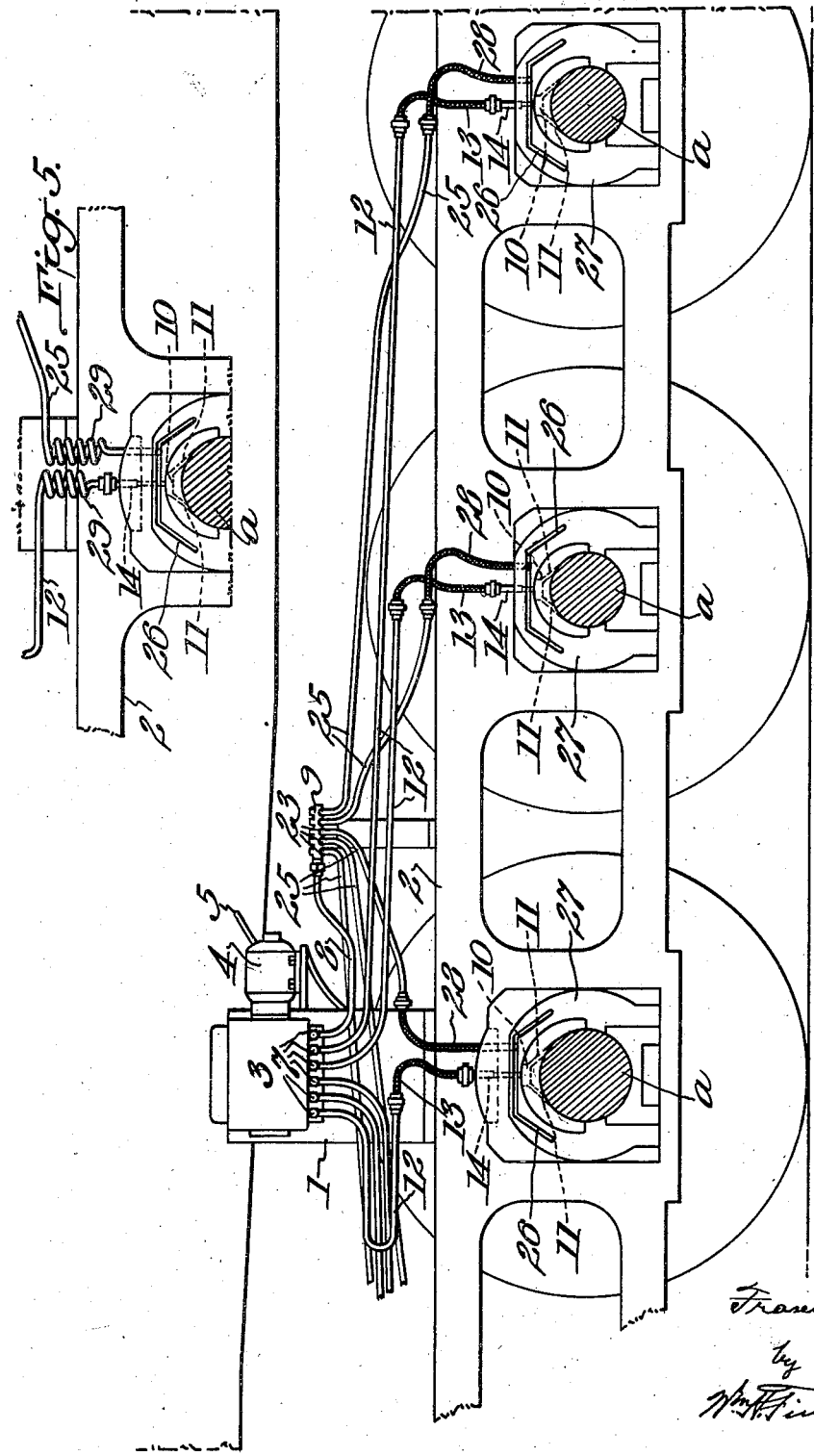

Patented Apr. 18, 1933

1,904,295

UNITED STATES PATENT OFFICE

FRANK W. EDWARDS, OF CHICAGO, ILLINOIS, ASSIGNOR TO THE OHIO INJECTOR COMPANY OF ILLINOIS, OF CHICAGO, ILLINOIS, A CORPORATION OF ILLINOIS

LUBRICATION ASSEMBLY

Application filed June 6, 1930. Serial No. 459,573.

This invention relates to an assembly of lubricating apparatus particularly adapted for the lubrication of the bearing brasses and wheel hub flanges of locomotives, although its utility is not limited to such installations but is applicable to other installations where it is desired to feed lubricant, preferably in measured quantities, or at a predetermined rate of feed, to a plurality of points to be lubricated.

The main object of the invention is to provide a lubrication assembly of such a nature that a single lubricator may supply lubricant to a plurality of points to be lubricated, such points usually being in relative proximity to the lubricator but separated therefrom.

The invention consists, essentially, in the combination with a lubricator, preferably of the mechanical force feed type having a plurality of feeds, of a distributor or manifold connected with and receiving lubricant from one of such feeds and provided with a plurality of outlets by means of which the lubricant may be split up or divided into a plurality of separate streams and fed to a similar plurality of points relatively easy to feed and requiring relatively scant lubrication, the remainder of the feeds of the lubricator being preferably directly connected with a like number of points relatively difficult to feed and requiring relatively copious lubrication, as I will proceed now to explain and finally claim.

In the accompanying drawings illustrating the invention, in the several figures of which like parts are similarly designated, Figure 1 is a somewhat diagrammatic sectional elevation, illustrating the application of the lubrication assembly of my invention to the axle brasses and hub faces of the drive wheels of a locomotive of the 2-10-2 type, the section being taken through the several axles between the wheel hubs and axle box bearing faces of the left hand side of the locomotive. Fig. 2 is a fragmentary detail showing, in sectional elevation, upon a larger scale, a portion of what is illustrated in Fig. 1. Fig. 3 is a sectional side elevation of the distributor or manifold. Fig. 4 is a vertical axial section of a terminal valve suitable for use in connection with my assembly. Fig. 5 illustrates a modified form of flexible connections between the lubricant conducting conduits and the points of delivery of lubricant.

Referring particularly to Figs. 1 and 2, it will be seen that I mount upon a suitable bracket 1 preferably rigidly attached to the side frame member 2 of the locomotive, a lubricator 3 of substantially the type disclosed in the copending application of Frank W. Edwards and Fordyce B. Farnsworth for patent for mechanical lubricator with individual motor drive, filed October 30, 1929, Serial No. 403,537, and in my copending application for patent for lubricating apparatus, filed October 26, 1929, Serial No. 402,719, provided with an individual driving motor 4, preferably an electric motor, to which operating current is supplied by means of a cable 5 extending into the cab 6 of the locomotive where it is connected with a suitable control switch, not shown.

The lubricator 3 is provided with a plurality of feeds 7 to which lubricant is supplied by the lubricator in predetermined measured quantities. One of these feeds is connected by means of a conduit 8 with the distributor or manifold 9.

As shown in the drawings, where the installation is made in combination with a locomotive having ten drive wheels, there will be ten axle brasses to which relatively copious quantities of lubricant must be fed into a tight bearing fit between such brasses and the axles, and ten hub bearing faces which, although requiring a constant adequate supply of lubricant, do not require as much as is necessary for lubrication of the axle brasses, and do not present such a tight bearing fit to which the lubricant must be fed.

Obviously this makes necessary the provision of twenty separate supplies of lubricant, ten of which must be relatively copious and at a pressure sufficient to penetrate the tight bearing fit between the axles and axle brasses, and the other ten of which need not be so copious and need not be supplied under any appreciable pressure because of the inherent relatively free wiping contact between the wheel hubs and the hub bearing faces of the boxes.

In the embodiment illustrated, it is shown as my intention to provide a locomotive of the type mentioned with two lubricators each of which has six feeds 7 and one of which lubricators is mounted upon each side of the locomotive frame, five of the feeds of each lubricator being utilized for direct application of lubricant to the axle brasses, and the remaining or sixth feed of each lubricator, as hereinbefore described, leading through a conduit 8 to a manifold 9 having five outlets, each of which outlets is suitably connected with the hub bearing face of one of the ten axle boxes.

Although this arrangement, wherein two lubricators are employed, is the preferred embodiment of my invention, it is obvious that I might use a single lubricator provided with twelve feeds, ten of which would be connected with the axle brasses and the other two of which would be connected with two distributors or manifolds similar to the manifold 9. Alternatively, instead of using a lubricator with twelve feeds, I might employ one having eleven feeds and connect one of such feeds to a distributor or manifold provided with ten outlets.

Each of the axle brasses is provided with a cavity 10 from which lead ducts 11 communicating with the bearing face of the brass, and to each of such brasses, and communicating with its cavity 10, I directly connect one of the feeds 7 by means of a suitable conduit or pipe 12 provided with an interposed flexible connection 13. Between such flexible connection and the cavity 10 of the bearing brass I interpose a terminal check valve 14, such, for example, as that illustrated in Fig. 4. This check valve, as will be apparent from its construction, permits lubricant to flow through it to the bearing from the point of introduction 15 to the point of discharge 16, the lubricant being supplied thereto under pressure sufficient to unseat the valve member 17. But, reverse flow of lubricant will be prevented.

As shown, the manifold or distributor 9 (Figs. 2 and 3) comprises a body provided with a longitudinal bore 18 into which lubricant is fed by way of the conduit 8, and formed upon the body of the manifold are five bosses 19. Each of these bosses has a duct 20 communicating with the bore 18 and with a cavity 21 with which cavity communicates a feed outlet 22 formed in an offstanding pipe connecting member 23, thus providing five feed outlets from the manifold whereby the supply of lubricant introduced into the bore 18 by way of conduit 8 may be split into five separate relatively equal streams. The ducts 20 are of such diameter as to permit an adquate predetermined flow of lubricant from the bore 18 into the cavities 21, and clean-out plugs 24 are provided in the several bosses 19 so that the ducts may be cleaned when necessary.

Each of the outlets 22 is connected by means of a pipe or conduit 25 with a groove 26 in the hub bearing face 27 of a bearing box and supplies lubricant thereto, and in each of said conduits or pipes 25 is interposed a flexible connection 28. As will be seen, particularly by reference to Fig. 2, the points of introduction of the lubricant to the grooves 26 by means of the pipes or conduits 25 are to one side of the vertical axial centers of their respective axles $a$ and wheel hubs, the rear sides, thereby supplying the lubricant in largest quantities to the rear or rising sides of the wheel hubs when the locomotive is in forward motion. Thus introduced, the lubricant will be more likely to be carried around by the hubs and produce adequate lubrication than if it were supplied mainly to the forward or lowering sides of the hubs with the consequent likelihood of being thrown off by centrifugal force to atmosphere before adequate lubrication could be derived from it.

In Fig. 2 I have indicated the flexible connections 13 and 28 as being of the metallic-sheathed tubing type, and this type of flexible connection is well adapted to my installation. However, as indicated in Fig. 5, instead of using such sheathed tubing, I may use, either for the entire length of the conduits, or for a portion thereof, steel or other tubing having the requisite elasticity to provide spring-like members or sections when coiled, and forming coils 29 therein which, in response to relative movement between the parts connected, may expand and contract to provide the desired flexible connections.

It will thus be seen that, by an assembly having the characteristics of my invention, I am enabled to provide adequate lubrication from one or more lubricators arranged in relative proximity to the points to be lubricated, but not directly adjacent thereto, to a plurality of such points in excess of the number of feeds provided by the lubricator proper, without sacrificing, in any degree, adequate lubrication of the parts to be lubricated.

Moreover, by providing for the supply of lubricant directly from the pressure or force feeds of the lubricator to the points to be lubricated against a relatively tight bearing seal (the bearings between the brasses and anxles), I am enabled to ensure proper and adequate lubrication at such points under adverse conditions presented during operation of the locomotive.

Furthermore, by splitting one of the lubricator feeds into a plurality of separate supplies of lubricant, I make possible an economy in the lubrication of the hub faces and their bearings, but, nevertheless, conduct an adequate supply of lubricant thereto.

It will be understood that although I have hereinbefore described the invention in an assembly including a six-feed lubricator with one feed thereof leading to a distributor, and in an assembly including a twelve-feed lubricator with two feeds thereof leading to two distributors, etc., it is susceptible of embodiment in an assembly including a lubricator having any desired number of feeds and any number of such feeds connected with any number of distributors, so that a variety of points of delivery of lubricant may be adequately and properly supplied with lubricant. Obviously, also the distributors used may have more or less than five feeds, as may be necessary or desirable.

Various changes and modifications, in addition to those specifically referred to, are considered to be within the spirit of the invention and the scope of the following claims and the claims are intended to be so construed.

What I claim is:—

1. In a lubrication assembly, a lubricator, a plurality of members to be lubricated each having a radial bearing and a thrust bearing, a plurality of lubricant feeds provided by said lubricator, one of such feeds connected with each of said radial bearings, a distributor, one of such feeds connected to said distributor, and a plurality of conduits connected with said distributor, one of said conduits connected with each of said thrust bearings, whereby lubricant may be supplied in adequate different quantities to a plurality of bearings in excesss of the number of feeds provided by said lubricator.

2. In a lubrication assembly, the combination with a locomotive having a plurality of wheels each having radial and thrust bearings, of a lubricator provided with a plurality of feeds, a distributor provided with a plurality of outlets, a connection for supplying lubricant to said distributor from one of said feeds, connections between others of said feeds and said radial bearings, and connections between said outlets and said thrust bearings.

3. In a lubrication assembly, the combination with a locomotive having a frame and a plurality of wheels movable relatively thereto, each having radial and thrust bearings, of a lubricator and a distributor carried by said frame, said lubricator provided with a plurality of lubricant feeds one of which supplies lubricant to said distributor and said distributor provided with a plurality of lubricant outlets, connections between said feeds and said radial bearings, connections between said outlets and said thrust bearings, and a flexible member interposed in each of said connections.

In testimony whereof I have hereunto set my hand this 3rd day of June A. D. 1930.

FRANK W. EDWARDS.